Aug. 21, 1951 F. WELLMAN 2,564,941
METHOD OF MAKING MOLDED LAMINATED ARTICLES
Filed Oct. 4, 1947
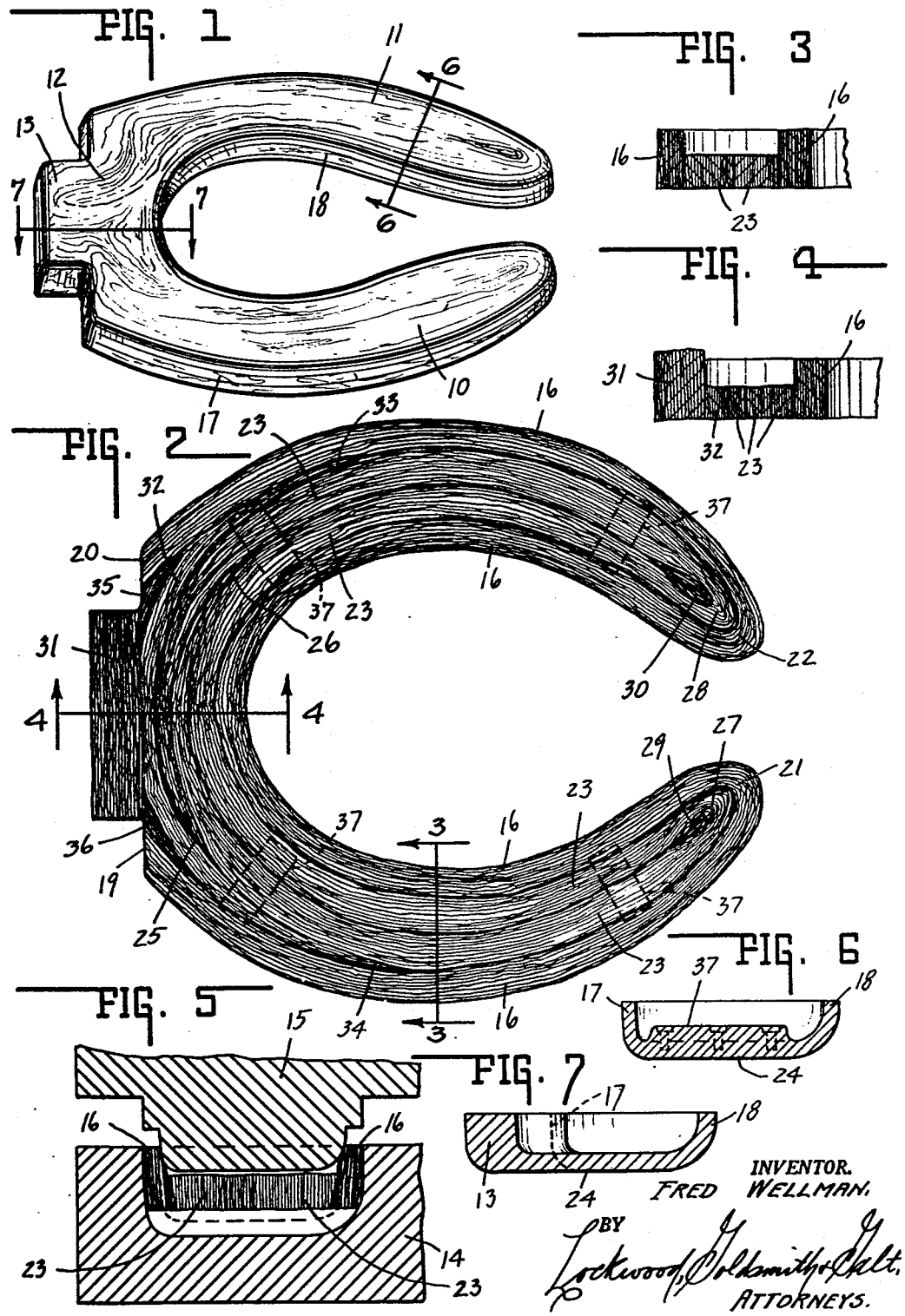
INVENTOR.
FRED WELLMAN.
BY
Lockwood, Goldsmith & Galt,
ATTORNEYS.

Patented Aug. 21, 1951

2,564,941

UNITED STATES PATENT OFFICE 2,564,941

METHOD OF MAKING MOLDED LAMINATED ARTICLES

Fred Wellman, Indianapolis, Ind.

Application October 4, 1947, Serial No. 777,958

7 Claims. (Cl. 154—110)

This invention relates to the art of manufacturing molded articles in which laminates of resin-impregnated fibrous material, such as calendered wood fibre, cloth, fiber glass, paper, and the like, are molded into the finished articles under heat and pressure which first causes the resin to melt and flow, filling out the mold, and then causes it to set and harden so as to firmly bind the laminates together in molded form.

In order that the article may have the strength conferred by laminating, the laminates must extend themselves throughout the mold along with the resin, since wherever laminates are not present, leaving only the resin, a weak spot results which is easily chipped or broken. Due to the inelastic nature of the laminate materials, such as cloth, fiber, and the like, which prevents their flowing or readily following in the path of the resin during the molding operation, it has heretofore proved difficult to satisfactorily fill out the mold with the laminates, especially in articles of complicated outline or with sections of varying heights and thickness.

A commonly employed method of fitting laminates to the contour of the mold resides in die-cutting them to a pattern and assembling them so that when placed in the mold their surfaces are normal to the direction of mold pressure. For articles of uniform cross section, this method is satisfactory and economical. However, for articles of complicated outline and varying cross section it is quite costly, inasmuch as in order to build up the different heights of section a number of differently shaped laminations may be required, each of which will demand an additional die and die-cutting labor. Furthermore, what is left of the sheets of material from which the laminations are die-cut usually amounts to a high proportion of the total sheet area. More often than not, the left-over portion of the sheet has no other important, practical use, and is therefore wasted.

A second method of forming molded laminated articles is to wind a continuous web of thin fibrous resin-impregnated material into a roll or coil of desired thickness, and to compress it to shape in the mold under heat and pressure, with the axis of the roll in the direction of mold pressure. This method, however, because of the limitation imposed by the circular form and tight wrap of the roll, which causes it to resist deformation, confines its application to relatively simple shapes having a minimum of cross-sectional variation.

Another deterrent to the wider use of laminate molded articles has been their lack of decorative value. Under methods previously employed, whether using die-cut laminates which are molded with the faces of the laminate normal to the direction of mold pressure, or rolls with their axes in the direction of mold pressure, the surfaces obtained have been monotonously uniform and unattractive. When used in the decorative arts, therefore, it has been necessary as a rule to provide them with a decorative cover, either molded in place or subsequently applied, or with a decorative finish of some kind.

It is one of the purposes of this invention to avoid and overcome the above noted limitations and disadvantages and to that end it consists in a new and novel method of mold-charge preparation in which the laminates are cut into strips of the required length and width or of varying lengths and widths and assembled into a plurality of flexible bands which may be readily arranged in the mold to conform therewith to provide an accurately proportional and positioned base charge that is sufficiently loose to enable the laminates readily to move or slide relative to each other under mold pressure. Said base charge, either alone or with added supplemental bands, bundles or coils of laminates, if needed, is finished to completely fill out the mold with the laminates as well as the resin. Thus, no weak spots devoid of laminate reenforcement are left in the molded article. This method may be practiced in one form by winding, coiling, or otherwise arranging the bands to the contour of the article with the faces of the laminates arranged in the direction of mold pressure, and with the width of the bands positioned and proportioned, in conjunction, when needed, with supplementary bands, coils, or bundles of laminates to conform substantially to variations in section height or thickness of the formed article.

Another advantage of the method herein disclosed resides in the strength imparted to the article, particularly wherein the laminates may be arranged to extend transversely to a line of fracture when force is applied to an article when in use.

As a result of this method wherein bands of laminates of required width or widths are arranged in readily movable relation and supplemented where needed with bands, bundles or supplementary coils to fill out the mold, attractive simulations of wood grain are created which may be infinitely varied in much the same manner as natural woods. This greatly enhances the appearance of the molded article and may be conveniently and artistically arranged through selection and/or interweaving of different laminate materials, variations in their widths and the coloring thereof, as well as the resins with which they are impregnated. Thus, one or both edges of the bands may be stained or treated with colored resins, and the larger laminated bands may be interspersed with smaller bands, bundles, or coils of laminates to create burl or knotty effects. Further, due to the inescapable variations in forming the bands various patterns are assumed and deformed under mold pressure, so that no two patterns will be exactly identical. This results both in individuality as well as attractiveness of the resultant surface in simulation of wood grains and other attractive decorative patterns.

The full nature of the invention will be understood from the accompanying drawings and the following description and claims:

Fig. 1 is a perspective view of a selected article illustrative of the design, form and surface configurations.

Fig. 2 is illustrative of the arrangement of the laminates in their adjacent or interposed relation for filling out a mold to form the article of Fig. 1.

Fig. 3 is a section taken on the line 3—3 of Fig. 2.

Fig. 4 is a section taken on the line 4—4 of Fig. 2.

Fig. 5 is a cross section illustrative of the mold for receiving the laminates of Fig. 2, to mold the article of Fig. 1, said section being substantially on the line 3—3 of Fig. 2 as shown in Fig. 3.

Fig. 6 is a section taken on the line 6—6 of Fig. 1.

Fig. 7 is a section taken on the line 7—7 of Fig. 1.

In the drawings for illustrating one form of article to be molded, there is shown an open end toilet seat having side extensions 10 and 11, a rear portion 12, and a hinge block 13. The article of Fig. 1 is molded under heat and pressure between the female die block 14 and the male die block 15, as shown in Fig. 5.

In charging the mold with the material to be formed thereby, laminates of a fibrous material, such as calendered wood fibre, cloth, fiber glass, paper, or the like, which have been impregnated with a suitable resin, are arranged in bands, bundles, or coils, as shown in Fig. 2, the structure of Fig. 2 being illustrative of the charge to be placed in the mold.

In Fig. 2 there is shown an outer band of laminates 16 arranged in such numbers, which when compressed will produce the outer flange 17 and the inner flange 18 of the article, as shown in Figs. 1 and 6. Also, the laminates of the band 16 are of a width as to provide the desired depth of said flanges 17 and 18, of the designated article, and as illustrated in Fig. 3. The band 16 has its terminal ends at 19 and 20, said ends being feathered so that they will lie in a plane angular to the laminates. Said band is folded back upon itself, as indicated at 21, 22, to produce the ends of the article, together with the outer and inner flanges 17 and 18 of the desired height, as a continuous lamination.

A supplementary or inner band 23 is folded within the outer band 16. Inasmuch as the inner band 23 is to provide the intermediate surface indicated at 24 in Figs. 6 and 7, the laminates are of lesser width than those of the band 16. A sufficient number of laminates are provided in the band 23 to completely fill the space between the inner and outer portions of the band 16, and their terminal ends, indicated at 25 and 26, are so feathered as to smoothly taper to a vanishing edge, such as to overlap each other and blend into adjacent bands while maintaining substantially a constant thickness of the band itself.

Wherein the band 23 is folded back sharply upon itself as at 27 and 28, so that its adjacent surfaces lie against each other, there may be left a space in the fold, which space is filled in with supplementary coils 29 and 30. Said coils are of the same width of laminate as the band 23 and are wedged to fill the gap left by the folding back of said band.

The rear portion 12 of the article terminates in the block 13 which block may be formed of a flat series of laminates 31 extending rearwardly from the terminal ends 19 and 20 of the band 16. While the block 13 is of the same height as the inner and outer flanges 17, 18, the thickness of this block requires an added amount of material, and so the laminates 31 are made of substantially greater width than the laminates 16, as shown in Fig. 4. Inasmuch as the block 13 is offset from the terminal ends 19, 20 of the band 16, there is a space left between said block and said terminal ends on the one hand, and the overlapping portions of the band 23 on the other hand. This space is filled by an arcuate band 32 formed of laminates having a width corresponding to that of the laminates of the band 23, as shown in Fig. 4. The arcuate band 32 has its opposite ends feathered to a vanishing edge, as indicated at 33, 34, to wedge into the tapered space between the bands 16 and 23. Due to the shape of the article at the rear portion, there still may be space to be filled in between the terminal ends 19, 20 of the band 16 and proximate laminates 31 and 32. In these spaces there are inserted short feathered groups of laminates 35 and 36 of the prescribed width and respective lengths to fill the gap.

In an article of the character herein illustrated, comprising a toilet seat, bosses are desirable which extend from the under surface for receiving rubber pads. One such boss is indicated at 37 in Fig. 6, to be formed by suitable placement in the mold of a bundle or coil of laminates arranged in substantial conformity to this part of the article. Upon the mold 14, 15 being correctly charged with the various bands and supplemental bands, bundles or coils of laminates, such as those indicated at 29, 30, 32, 35, and 36, said laminates, being easily movable under pressure in their face to face relationship, adjust themselves readily to take the form of the mold in sufficient degree completely to fill out the mold and resultant molded article.

Because of the inelasticity of fibrous material, there may be produced some minor ruptures in certain laminates when pressed into final form, or there may result slight voids between bands of laminates and supplemental bands, bundles, or coils. These will be filled with resin; however, their presence will be sufficiently minor and unimportant not to weaken the structure nor to cause it to fail in the service for which it is intended. Further, where present, the slight irregularities caused by such ruptures or voids add to rather than detract from the decorative surface pattern.

Inasmuch as the bands of laminates comprising the mold-charge have a greater bulk or volume than the finished article, and the width of the laminates, therefore, is greater than the thickness to which they are finally compressed, with their surfaces arranged in the direction of mold pressure, a noticeable waviness will be imparted to the laminates as they are slid, bent, or spread relative to each other in accommodating themselves under pressure to the contour of the mold. Such defroming of the laminates results in a grain-like configuration to the finished article of pleasing appearance and in simulation of wood grain. The width of grain can be appreciably controlled by varying the tightness of the charge. A somewhat loose arrangement or packing of the laminates will tend to widen the grain, whereas packing them more tightly will tend to make it finer. The interposed fillers of the bundles or coils of laminates simulate when compressed the usual burl or knotty effect of the natural wood grains, or the mating of natural woods. Such decorative finish may further be enhanced and unusual patterns obtained through coloring effects. Thus, the individual laminates, bands, bundles, or coils, as well as the resin employed, may be given various colors and interspersed so that the blending thereof in the finished molded article will develop attractive wood and other decorative color patterns.

The invention claimed is:

1. The method of molding laminated articles which consists of cutting strips of resin-impregnated fibrous material to uniform widths, grouping strips of the same widths into bands, positioning the bands so that they extend in the direction of the length of the article to be produced, with the bands of greater width placed in the sections of the finished article in which the height of a vertical cross-section is correspondingly greater, and with the direction of the width of the strips normal to the general direction of the major surface of the finished article, employing heat and pressure to cure the resin and to compress the strips to produce a solid laminate with a varying cross-sectional thickness.

2. The method of molding laminated articles set forth in claim 1 with the addition of coloring the bands to produce wood-grain and other decorative effects extending throughout the length and from surface to surface of the finished article.

3. The method of molding laminated articles set forth in claim 1 with the addition of varying the coloring of the bands and interspersing them to produce wood-grain and other decorative effects throughout the length and from surface to surface of the finished article.

4. The method of molding laminated articles set forth in claim 1 with the addition of coloring the bands and inserting small bundles of laminates to produce burled or knotty wood-grain effects from surface to surface of the finished article.

5. The method of molding laminated articles set forth in claim 1 with the addition of varying the coloring of the bands and inserting small bundles of laminates to produce burled or knotty wood-grain effects from surface to surface of the finished article.

6. The method of producing wood-grain and other decorative effects in molded laminated articles which consists of cutting strips of resin-impregnated fibrous material of suitable width and coloring, grouping said strips into bands of suitable thickness, positioning said bands in the mold in substantially parallel relation so that the bands extend in the direction of the length of the article to be produced, and with the direction of the width of the strips normal to the general direction of the surface of the finished article, employing heat and pressure to cure the resin and to compress the strips to produce a solid decorative laminate in which the wood-grain or other decorative pattern extends from end to end and surface to surface of the finished article.

7. The method of producing wood-grain and other decorative effects in molded laminated articles set forth in claim 6, with the addition of inserting small bundles of laminates of suitable width, coloring and thickness into the main body of laminates to produce pleasing irregularities such as burl or knotty effects in the wood-grain or other decorative pattern from surface to surface of the finished article.

FRED WELLMAN.

REFERENCES CITED

The following references are of record in the file of this patent:

UNITED STATES PATENTS

| Number | Name | Date |
|---|---|---|
| 1,205,345 | Hatfield | Nov. 21, 1916 |
| 1,444,959 | Dickey | Feb. 13, 1923 |
| 2,001,977 | Riddell | May 21, 1935 |
| 2,452,739 | Fairchild | Nov. 2, 1948 |